United States Patent
Goodwin, III et al.

(10) Patent No.: US 6,496,805 B1
(45) Date of Patent: Dec. 17, 2002

(54) METHOD OF TEMPORARILY DISPLAYING INFORMATION BY AN ELECTRONIC PRICE LABEL

(75) Inventors: John C. Goodwin, III, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/394,541

(22) Filed: Sep. 10, 1999

(51) Int. Cl.[7] ............................................. G06F 17/60
(52) U.S. Cl. ........................................ 705/20; 705/23
(58) Field of Search ........................................... 705/20

(56) References Cited

U.S. PATENT DOCUMENTS

| | | | |
|---|---|---|---|
| 4,002,886 A | 1/1977 | Sundelin | 235/61.7 R |
| 4,500,880 A | 2/1985 | Gomersall et al. | 340/825.35 |
| 4,924,363 A | 5/1990 | Kornelson | 362/125 |
| 5,172,314 A | 12/1992 | Poland et al. | 364/401 |
| 5,241,467 A * | 8/1993 | Failing et al. | 364/401 |
| 5,448,226 A | 9/1995 | Failing, Jr. et al. | 340/825.35 |
| 5,794,211 A | 8/1998 | Goodwin, III et al. | 705/23 |
| 5,914,670 A * | 6/1999 | Goodwin, III et al. | 705/14 |
| 6,047,263 A * | 4/2000 | Goodwin, III | 705/20 |
| 6,173,268 B1 * | 1/2001 | Goodwin, III | 705/20 |

FOREIGN PATENT DOCUMENTS

JP  2000250497  *  9/2000  .......... G09G/05/00

OTHER PUBLICATIONS

Morton, Jerry "ESL: Up and running", Progressive Grocer v72n12, Dec. 1993, 2 pages.*
Business Wire, "INTACTIX INTL: Stew Leonard's Installs Procer's ESLs", Nov. 4, 1994.*
Amato–McCoy, Deena, "Harvey's aims to cut abor costs with ESL testing", Supermarket News v47n19p25, Dec. 1997.*

* cited by examiner

Primary Examiner—Gregory A. Morse
(74) Attorney, Agent, or Firm—Paul W. Martin; Paul & Goldstein, PLLC

(57) ABSTRACT

A method of temporarily displaying information by an electronic price label which avoids resending previously-displayed information. The method implemented by the electronic price label includes receiving a first message containing a first command to display first contents of a first memory area identified by a first memory locator, storing a second memory locator identifying a second memory area containing second memory contents currently being displayed in a third memory area, receiving a second message containing a second command to redisplay the second contents of the second memory area, reading the second memory locator from the third memory area, reading the second memory contents from the second memory area, and displaying the second memory contents.

20 Claims, 2 Drawing Sheets

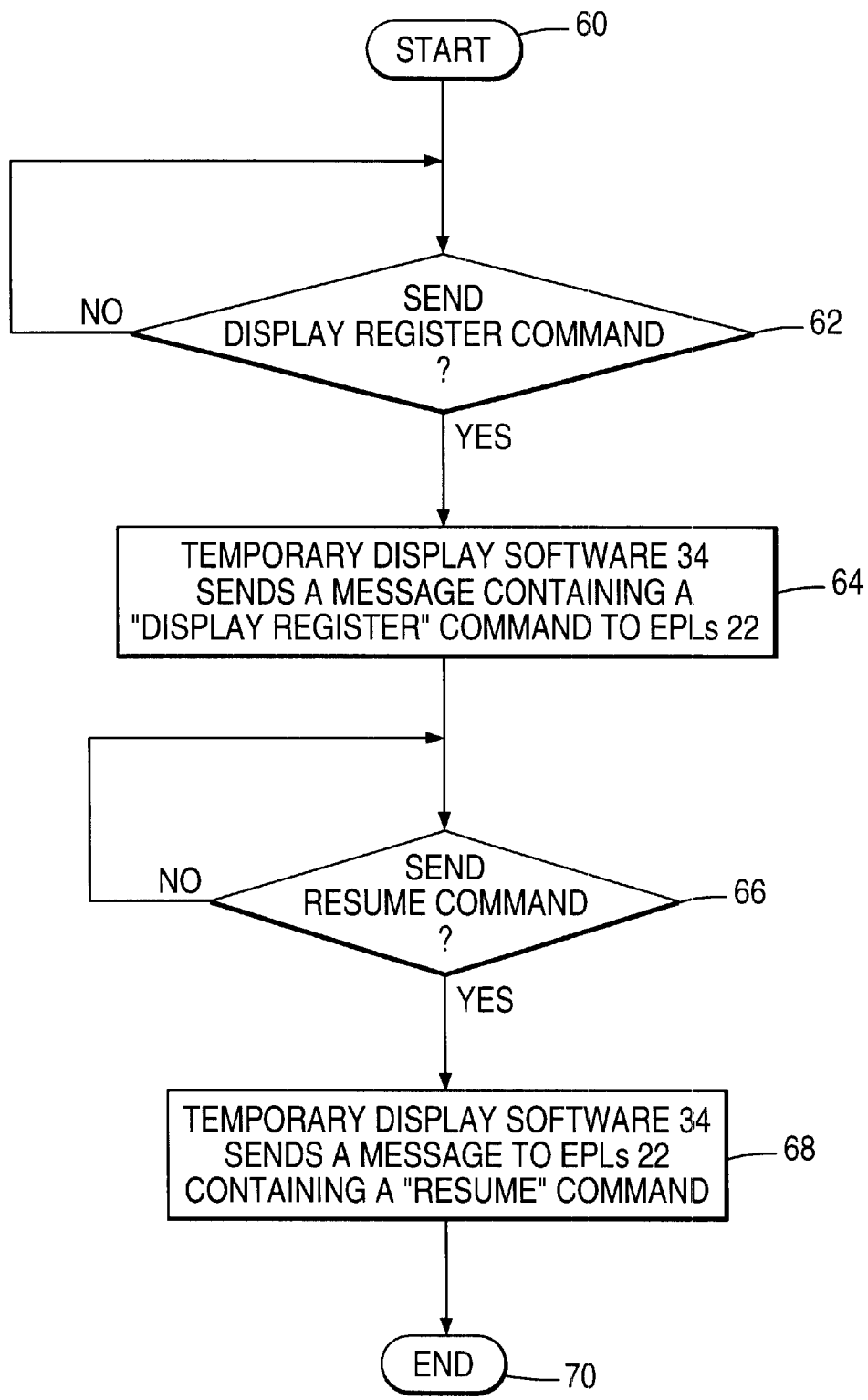

METHOD OF TEMPORARILY DISPLAYING INFORMATION BY AN ELECTRONIC PRICE LABEL

BACKGROUND OF THE INVENTION

The present invention relates to electronic price label (EPL) systems, and more specifically to a method of temporarily displaying information by an EPL.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs are also being used to display more than just price information. For example, retailers are using EPLs to display employee-directed information which employees use to manage a store. Employees may be restocking shelves, taking inventory, and performing other store-related tasks using the information displayed by EPLs 22 as necessary.

Examples of employee-directed information include "Pull from Loc XYZ" (pull stock from back room location XYZ), 5 Deep (stock this item 5 deep on this location, "5 Deep/2 Wide" (stock this item 5 facings deep and 2 facings wide for this location), "17 in Location" (stock 17 of this item at this location), "4 locs" (this item is located at 4 different locations within the store).

Therefore, it would be desirable to provide a method of controlling display of temporary information, such as employee-directed information. It would also be desirable to temporarily display and resume display of previously displayed information.

SUMMARY OF THE INVENTION

In accordance with the teachings of the present invention, a method of temporarily displaying information by an EPL is provided.

The method implemented by the electronic price label includes receiving a first message containing a first command to display first contents of a first memory area identified by a first memory locator, storing a second memory locator identifying a second memory area containing second memory contents currently being displayed in a third memory area, receiving a second message containing a second command to redisplay the second contents of the second memory area, reading the second memory locator from the third memory area, reading the second memory contents from the second memory area, and displaying the second memory contents.

An electronic price label system includes an electronic price label and a computer. The electronic price label includes a memory containing a plurality of areas, including a first area identified by a first memory locator and containing currently displayed first information. The computer sends a first message containing a first command to display temporary second information from a second memory area identified by a second memory locator for a predetermined time period, determines an end of the predetermined time period, and sends a second message containing a second command to redisplay the first information. The electronic price label receives the first message, stores the first memory-locator in a third memory area, displays the second information, receives the second message, reads the first memory locator from the third memory area, reads the first information from the first memory area, and redisplays the first information.

It is accordingly an object of the present invention to provide a method of temporarily displaying information by an EPL.

It is another object of the present invention to provide a method of temporarily displaying information in a particular memory register.

It is another object of the present invention to provide a method of temporarily displaying information in a particular memory register using a broadcast message.

It is another object of the present invention to provide a method of temporarily displaying employee-directed information by an EPL.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating a method of temporarily displaying information in accordance with the present invention.

DETAILED DESCRIPTION OF THE PREFERRED EMBODIMENT

Figure 1:
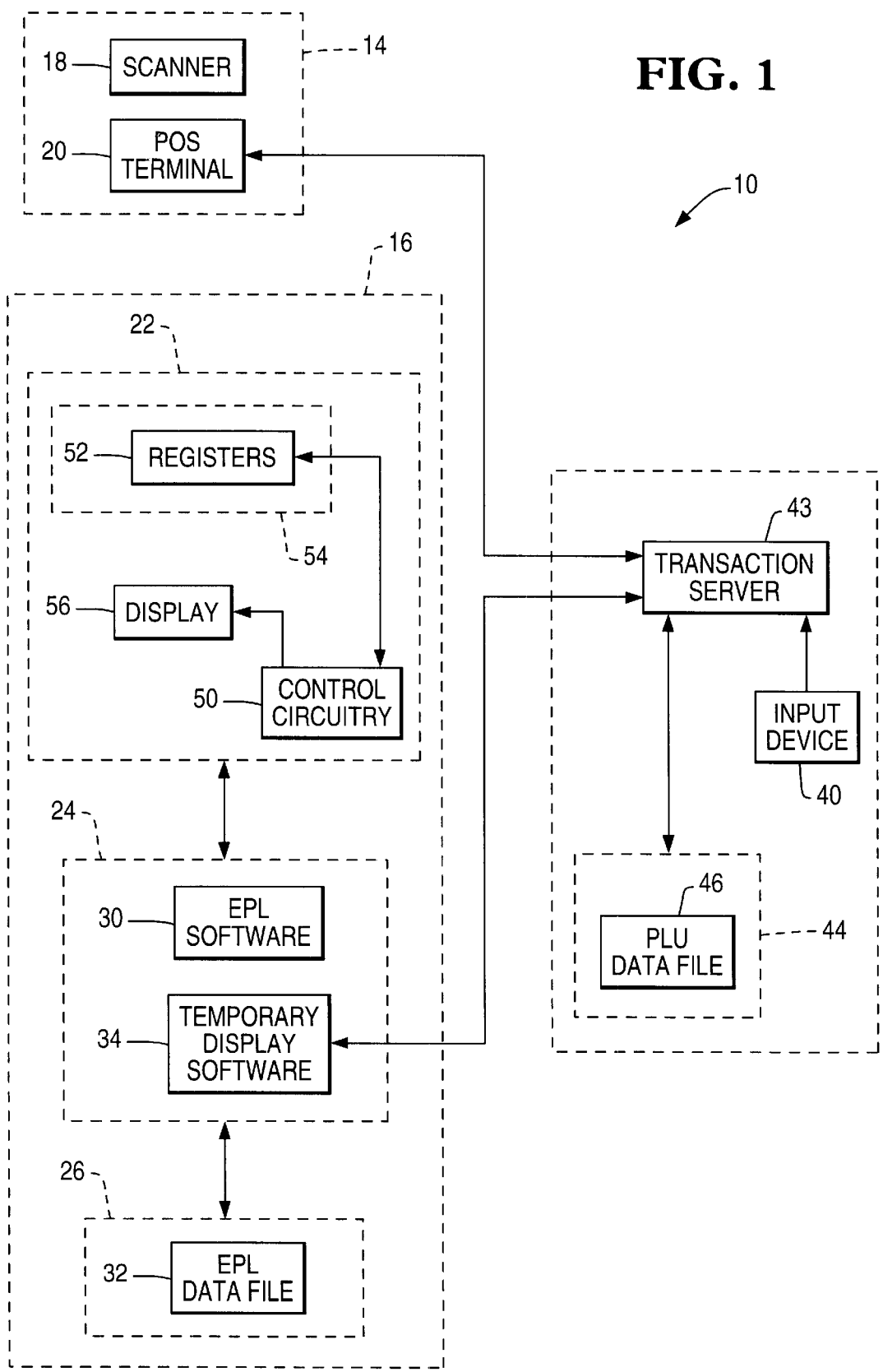
FIG. 1 is a block diagram of a transaction processing system.

Referring now to FIG. 1, a first embodiment of transaction system 10 primarily includes host computer system 12, point-of-sale (POS) system 14, and EPL system 16. Here, components 12, 14, and 16 are shown as separate components that are networked together, but they may also be combined in different ways to form less components. Thus, host computer system 12 may be a POS terminal which doubles as a host computer for network of other POS terminals. Also, host computer system 12 and EPL system 16 may be combined into a single system.

POS system 14 includes bar code reader 18 and terminal 20.

EPL system 16 primarily includes EPLs 22, host EPL terminal 24, and EPL storage medium 26.

EPLs 22 include control circuitry 50, memory 54, and displays 56.

Control circuitry 50 receives and transmits messages from EPL terminal 24 and controls display of information by display 56. Control circuitry 50 stores data within the messages, such as price and promotional information, in memory 54.

Control circuitry 50 executes instructions from host EPL terminal 24. Two such instructions under the present invention are the "Display Register" and "Resume" commands. The Display Register command instructs control circuitry 50 to display the contents of a designated register in the instruction. In response to the Display Register command, control circuitry 50 stores the register number of the register whose contents are currently being displayed before displaying the contents of the designated register. EPLs 22 have enough registers 52 to maintain previous displayed information in memory 52 during the temporary period.

The Resume command instructs control circuitry 50 to display the previously displayed information. In response to the Resume command, control circuitry 50 obtains the register number of the register whose contents were previously being displayed and redisplays the contents.

Memory 54 includes data registers 52. One of registers 52 preferably contains employee-directed information for use by employees after store hours.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLs 22. EPL software 30 obtains prices in price look-up (PLU) data file.

Host EPL terminal 24 also executes temporary display software 34 which manages display of temporary information, such as employee-directed information, by EPLs 22. Under the present invention, temporary display software 34 initiates automatic or operator-initiated messages which cause EPLs 22 to temporarily display information. Temporary display software 34 preferably causes EPL software 30 to send EPLs 22 a message containing a Display Register command naming a designated register which contains employee-directed information. Following the temporary display period, temporary display software 34 causes EPL software 30 to send EPLs 22 a message containing a Resume command instructing EPLs 22 to resume display of previously displayed data.

The messages may be individually addressed messages or broadcast messages. Employee-directed information is one type of information that is usually displayed by all EPLs 22. For this type of information, temporary display software 34 sends broadcast messages to EPLs 22 containing the Display Register and Resume commands.

EPL storage medium 26 stores EPL data file 32. EPL storage medium 26 and is preferably a fixed disk drive.

EPL data file 32 contains EPL identification and checksum information. Checksum information is calculated from price information in PLU data file 46. EPL data file 32 identifies information that is currently stored and displayed by EPLs 22.

Host computer system 12 includes PLU storage medium 44, transaction server 42, and input device 40.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Turning now to FIG. 2, operation of temporary display software 34 begins with START 60.

In step 62, temporary display software 34 waits for an indication to send a Display Register command to EPL 22. The indication may come from its own internal scheduler (automatic operation) or from operator action (manual operation).

In step 64, temporary display software 34 causes EPL software 30 to send a message containing a Display Register command to EPL 22. EPL 22 receives the message, remembers the currently active register 52, and displays information in the designated register 52.

The message may be a broadcast message, appropriate for employee-directed information, or an individually-addressed message.

In step 66, temporary display software 34 waits for an indication to send a Resume command.

In the case of employee-directed information, the a temporary period may be one in which employees may be restocking shelves, taking inventory, and performing other store-related tasks using the information displayed by all EPLs 22 as necessary.

Operation proceeds until temporary display software 34 determines that the temporary display period has ended, manually or through automatic scheduling.

In step 68, at the end of the temporary period, temporary display software 34 causes EPL software 30 to send EPL 22 a message a Resume command. EPL 22 activates the previous register 52 to resume display of information it was displaying prior to the temporary display period.

In step 70, operation ends at END.

For example, employees typically need to restock shelves, take inventory, and perform other tasks after store hours. Temporary display software 34 sends a broadcast message containing a Display Register command. If EPL 22 contain four data registers 52 and employee-directed information is stored within register number four, then temporary display software 34 sends a "Display Register 4" command. EPL 22 remember which register 52 was active before the Display Register command was received.

Following the temporary period, temporary display software 34 sends a Resume command. If EPL 22s were displaying price (e.g., "99¢|$3.50") or promotional information (e.g., "On Sale") before the Display Register command was received, then EPL 22 resume display of such information following reception of the Resume command. EPL 22 activates the register 52 that was active before the Display Register command was received.

Advantageously, the method of the present conserves bandwidth an effectively uses memory 54 by not having to resend previously-displayed information.

Although the present invention has been described with particular reference to certain preferred embodiments thereof, variations and modifications of the present invention can be effected within the spirit and scope of the following claims.

What is claimed is:

1. A method of temporarily displaying information by an electronic price label comprising the steps of:

displaying second memory contents by the electronic price label;

receiving a first message containing a first command to display first contents of a first memory area identified by a first memory locator by the electronic price label;

storing a second memory locator in a third memory area by the electronic price label, said second memory locator identifying a second memory area containing the second memory contents currently being displayed by the electronic price label;

displaying the first contents of the first memory area by the electronic price label;

receiving a second message containing a second command to redisplay the second contents of the second memory area by the electronic price label;

reading the second memory locator from the third memory area by the electronic price label;

reading the second memory contents from the second memory area by the electronic price label; and displaying the second memory contents by the electronic price label.

2. A method of temporarily displaying employee-directed information by an electronic price label comprising the steps of:

displaying second memory contents by the electronic price label;

receiving a first message containing a first command to display employee-directed first information from a first memory area identified by a first memory locator by the electronic price label;

storing a second memory locator in a third memory area by the electronic price label, said second memory locator identifying a second memory area containing the second memory contents currently being displayed by the electronic price label;

displaying the first contents of the first memory area by the electronic price label;

receiving a second message containing a second command to redisplay the second contents of the second memory area by the electronic price label;

reading the second memory locator from the third memory area by the electronic price label;

reading the second memory contents from the second memory area by the electronic price label; and displaying the second memory contents by the electronic price label.

3. An electronic price label system which comprises:

an electronic price label including a memory containing a plurality of areas, including a first area identified by a first memory locator and containing currently displayed first information; and a computer which sends a first message containing a first command to display temporary second information for a predetermined time period, determines an end of the predetermined time period, and sends a second message containing a second command to redisplay the first information, said temporary second information located in a second memory area identified by a second memory locator;

wherein the electronic price label receives the first message, stores the first memory locator in a third memory area, displays the second information, receives the second message, reads the first memory locator from the third memory area, reads the first information from the first memory area, and redisplays the first information.

4. The method of claim 1 further comprising the step of:
sending the first message to the electronic price label by a host computer.

5. The method of claim 1 further comprising the step of:
sending the second message to the electronic price label by a host computer.

6. The method of claim 5 wherein the second message includes a resume command.

7. The method of claim 1 wherein the memory elements are each registers and the memory locators are each register numbers.

8. The method of claim 7 wherein the first message includes a display register command.

9. The method of claim 1 wherein the first message is a broadcast command transmitted to a plurality of electronic price labels.

10. The method of claim 2 further comprising the step of:
sending the first message to the electronic price label by a host computer.

11. The method of claim 2 further comprising the step of:
sending the second message to the electronic price label by a host computer.

12. The method of claim 11 wherein the second message includes a resume command.

13. The method of claim 2 wherein the memory elements are each registers and the memory locators are each register numbers.

14. The method of claim 13 wherein the first message includes a display register command.

15. The method of claim 2 wherein the first message is a broadcast command transmitted to a plurality of electronic price labels.

16. The electronic price label system of claim 3 wherein the computer executes temporary display software for automatically sending the messages to the electronic price label.

17. The electronic price label system of claim 3 wherein the second message includes a resume command.

18. The electronic price label system of claim 3 wherein the memory elements are each registers and the memory locators are each register numbers.

19. The electronic price label system of claim 18 wherein the first message includes a display register command.

20. The electronic price label system of claim 3 wherein the first message is a broadcast command transmitted to a plurality of electronic price labels.

* * * * *